May 12, 1936. T. V. BUCKWALTER 2,040,802
ROLLER BEARING AXLE
Filed Oct. 8, 1934 2 Sheets-Sheet 1
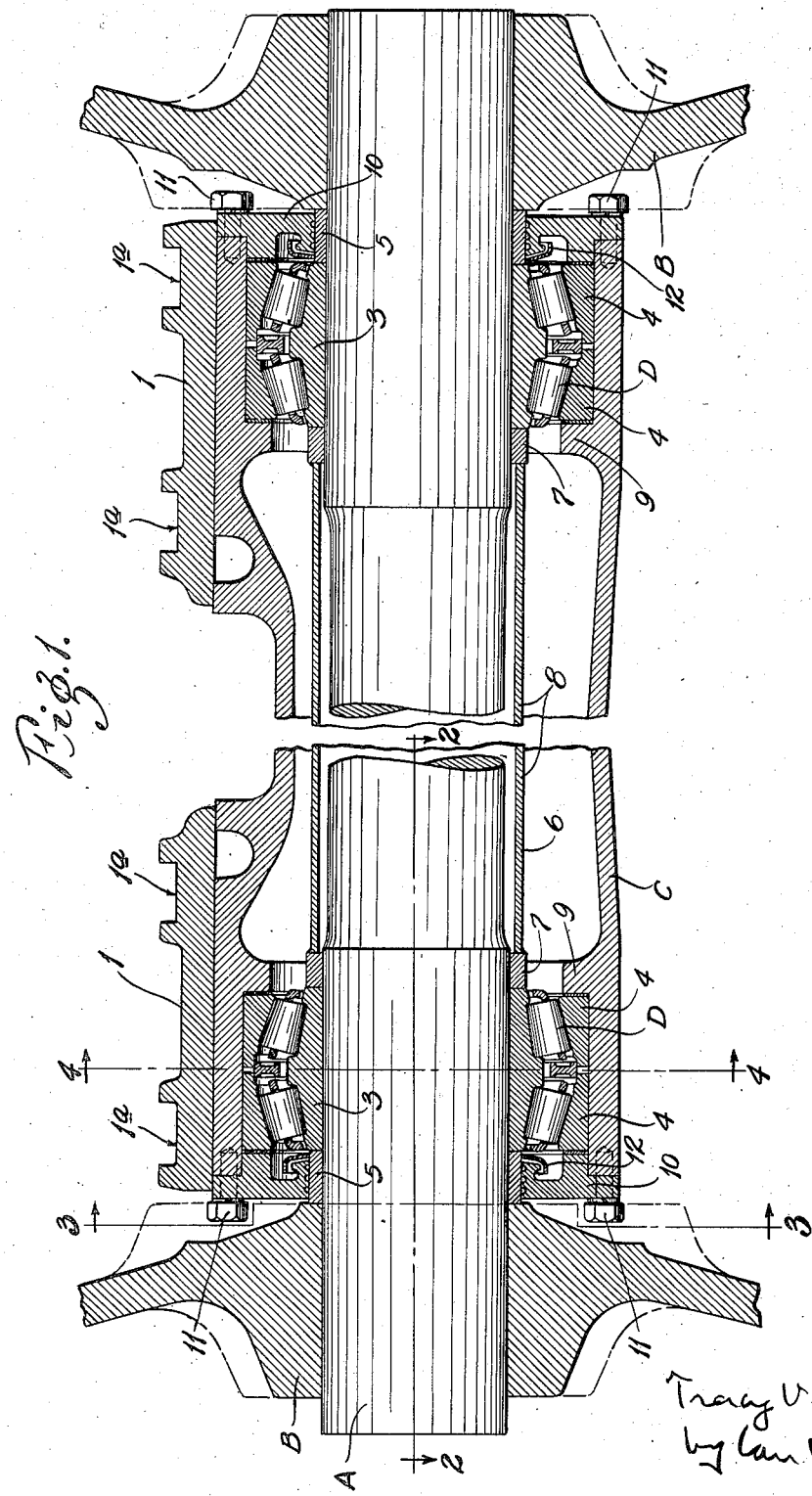
INVENTOR:
Tracy V. Buckwalter,
by Cam Kam & Gravely,
HIS ATTORNEYS.

May 12, 1936.  T. V. BUCKWALTER  2,040,802
ROLLER BEARING AXLE
Filed Oct. 8, 1934   2 Sheets-Sheet 2
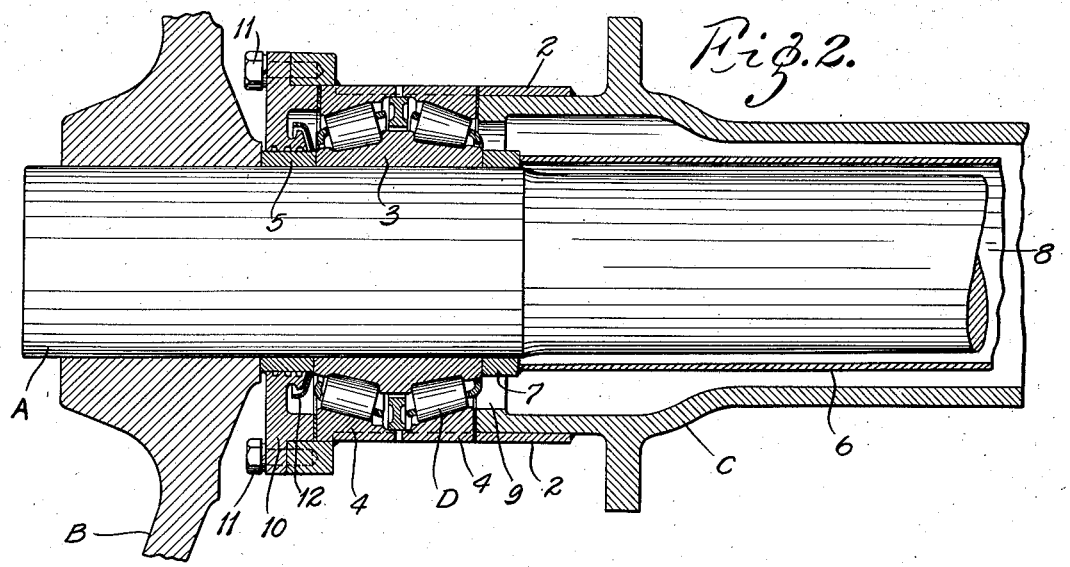
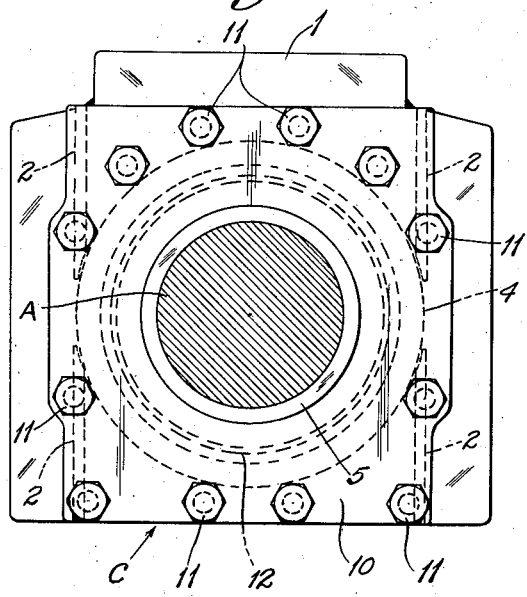 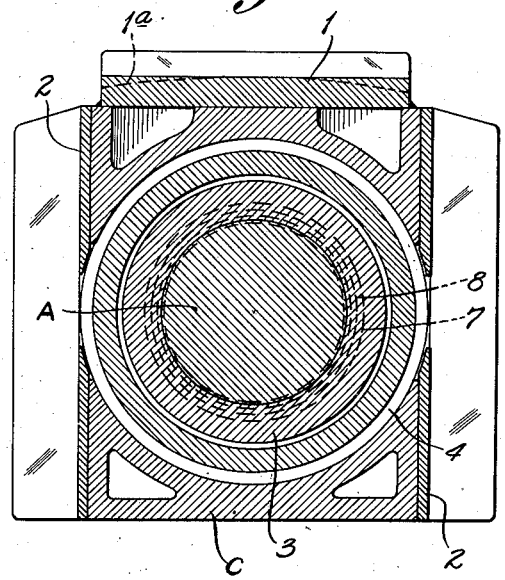
INVENTOR:
Tracy V. Buckwalter,
by Cantlan & Gravely,
HIS ATTORNEYS.

Patented May 12, 1936

2,040,802

UNITED STATES PATENT OFFICE 2,040,802

ROLLER BEARING AXLE

Tracy V. Buckwalter, Canton, Ohio, assignor to The Timken Roller Bearing Company, Canton, Ohio, a corporation of Ohio Application October 8, 1934, Serial No. 747,416

4 Claims. (Cl. 295—36)

This invention relates to roller bearing axle constructions, particularly to roller bearing car axle constructions of the type wherein the housing surrounds the axle between wheels rigidly mounted on the ends thereof and the load is transmitted to the axle through roller bearings that are interposed between the axle and the ends of the housing and have their inner raceway members shrunk on or secured with a heavy press-fit to the axle with one end in abutting relation to a rib thereon. In such a construction, the axle is subject not only to beam stresses due to the load thereon but it is also subject in the portions covered by the tight fitting raceway members to circumferential compressive or hoop stresses; and there is an abrupt change of stress in the axle at the ends of said raceway members with consequent liability to fracture there. With such a construction, the abutment rib on the axle also contributes to the concentration of such stress therein and it also necessitates the removal of the roller bearings when the axle is removed endwise from the housing. The principal objects of the present invention are to protect the axle from breakage due to the concentrated stresses transmitted to it by the parts press-fitted thereon, to permit the removal and insertion of the axle without disturbing the roller bearings, and to provide for simplicity and cheapness of construction and compactness of design.

The invention consists in the axle bearing construction and in the construction, combination and arrangements of parts hereinafter described and claimed.

In the accompanying drawings, which form part of the specification, and wherein like symbols refer to like parts wherever they occur, Fig. 1 is a vertical longitudinal sectional view of a roller bearing railway car axle construction conforming to my invention, Fig. 2 is a horizontal longitudinal section on the line 2—2 in Fig. 1, Fig. 3 is a transverse section on the line 3—3 in Fig. 1, and Fig. 4 is a similar section on the line 4—4 in Fig. 1.

Referring to the accompanying drawings, my invention is shown in connection with a roller bearing car axle construction of the inboard type comprising a solid axle A having wheels B shrunk on or secured with a heavy press-fit to the ends thereof. Between wheels the axle is enclosed within a suitable housing C, which transmits the load to the axle through roller bearings D interposed between the axle and housing at the ends of the latter.

At each end, the axle housing is enlarged to accommodate a roller bearing D; and is provided with a flat-topped face adapted to support a suitable adapter plate 1 having two pairs of upstanding ribs or lugs that extend transversely of the housing and serve to define seats 1a for the truck equalizer bars (not shown) of the truck. The sides of the enlarged end portion of the axle housing are slabbed-off to fit standard truck pedestal guides (not shown) and have suitable wear plates 2 secured thereto.

The roller bearings at the ends of the axle housing each preferably comprises a duplex cone or inner raceway member 3 mounted on the axle A, cups or outer raceway members 4 mounted in said end of said housing, and conical bearing rollers located between said cone and the respective cups. Each bearing cone is spaced from the wheels adjacent thereto by a relatively short sleeve 5 mounted on the axle between the cone and the wheel hub, and the two bearing cones are spaced apart by a relatively long spacing sleeve 6 mounted on the axle between said cones. The spacing sleeve 6 preferably comprises cone engaging end portions 7 that engage the axle and an intermediate portion 8 that is spaced from said axle. The cones and the end and intermediate spacing sleeves have a light fit on the axle and are held in endwise abutting relation on the axle by the wheels press-fitted thereon and are thus forced to rotate with the axle. The cups at each end of the housing are located between an annular rib 9 therein and the inwardly extending flange of an annular closure plate 10 which surrounds the spacing ring 5 and is removably secured to the end of the housing preferably by means of cap screws 11. A suitable oil flinger ring 12 is fixed to each spacing sleeve 5 in overlapping relation to the adjacent end closure ring 10 for preventing the escape of lubricant through the joint between said spacing ring and said closure ring.

In order to prevent fracture of the axle due to concentrated hoop stresses and beam stress at the ends of the cones caused by cones that are mounted on the axle with a heavy press-fit, the cones 3 of the present construction are mounted on the axle with a light-fit, thereby reducing the tightness of the circumferential grip of the cones on the axle to a minimum throughout the length of said cones. Localization and concentration of such stresses in the axle at the ends of the wheel hub are also minimized by reducing the diameter of the wheel hub from the conventional size indicated in dotted lines in Fig. 1 to the size indicated in full lines in said figure. The light fit of the cone and spacing sleeves on the axle also permits the complete bearings, the end and intermediate spacing sleeves and the end closure plate to be assembled in proper running condition in the axle housing for mounting on the axle as a unit by merely inserting the axle endwise through the housing and forcing the wheels on the ends of the axle until the wheel hub, cones and spacing sleeve are brought into abutting relation on the axle.

As shown in the drawings, the axle is made long enough to project at one end beyond the hub of the wheel thereon so that the axle may be adjusted axially of the wheel hubs and bearing cones. The purpose of adjustment is to enable different portions of the axle to be brought into position opposite the ends of the bearing cones and the wheel hubs and thus prevent fatigue of the metal at these points of greatest stress concentration. The axle is made long enough to permit an adjustment to be made at each regular shopping period when the entire axle construction is being inspected and overhauled.

The hereinbefore described construction has many advantages. Concentrated stresses in the axle at the ends of the bearing cone are reduced to a minimum by reason of the light fit of the cones on the axle, the elimination of the cone thrust rib on the axle and by the reduced diameter of the end portions of the wheel hub. By enabling the axle to be adjusted endwise of the wheel and bearing cones, new surfaces of the axle may be presented to the points of greatest stress concentration and thus prevent fracture of the axle at these points due to fatigue of the metal. The construction permits the axle housing, with the bearings, adjusting sleeves and end closure plates mounted therein in proper adjustment to be furnished as a complete unit for assembly with the axle, which is merely inserted endwise into the housing and the wheels press-fitted thereon in the usual manner. Other advantages of the foregoing axle construction are simplicity of construction, reduction in weight without sacrifice of strength and reduced cost of manufacture.

Obviously, the hereinbefore described construction admits of considerable modification without departing from the invention. Therefore, I do not wish to be limited to the precise construction shown and described.

What I claim is:

1. A roller bearing car axle construction comprising an axle, wheels rigidly mounted on the ends of said axle, a housing surrounding said axle between the wheels thereon, and roller bearings interposed between said axle and said housing at the ends of the latter, each of said roller bearings comprising an outer raceway member mounted in said housing, an inner raceway member having a light fit on said axle, and bearing rollers interposed between said inner and outer raceway members, said axle being made enough longer than the distance between the outer ends of the wheel hubs and being free from obstructions preventing shifting of said axle axially in said inner raceway members, whereby said axle is adapted to be shifted axially of said inner raceway members and wheel hubs while maintaining contact with the latter the full length thereof.

2. A roller bearing axle construction comprising an axle, wheels on the ends of said axle, a housing surrounding said axle between the wheels thereon, and roller bearings interposed between said housing and said axle, said axle being free from obstructions preventing shifting thereof axially of said roller bearings and said wheels and extending beyond the outer end of one of said wheels far enough to permit said axle to be adjusted axially in said housing toward the other of said wheels to bring different portions of the axle into engagement with said wheels and said roller bearings without reducing the extent of contact between said axle and said first mentioned wheel.

3. A roller bearing car axle housing adapted for assembly with and disassembly from an axle axially thereof as a unit, said housing comprising a one piece tubular body portion, axially spaced roller bearings mounted in said housing against endwise movement therein, a spacing sleeve mounted in said housing between said roller bearings, an annular end closure removably secured to each end of said housing, and a spacing sleeve located within the opening in said end closure adjacent to the outer end of each bearing, said last mentioned spacing sleeve having an outstanding flange disposed between said end closure and said end of said bearing whereby said last mentioned spacing sleeve is removably retained in said housing by said end closure.

4. A roller bearing car axle construction comprising an axle, wheels press-fitted on the ends of said axle, a housing surrounding said axle between the wheels thereon and roller bearings interposed between said axle and said housing at the ends of the latter, each of said roller bearings comprising an outer raceway member mounted in said housing, an inner raceway member having a light fit on said axle and bearing rollers interposed between said inner and outer raceway members, a spacing sleeve having a light fit on said axle between said inner raceway members, spacing sleeves having a light fit on said axle between said wheels and said inner raceway members, said inner raceway members and said spacing sleeves being held together in endwise abutting relation on the axle by the wheels press-fitted on the ends thereof, said axle being made enough longer than the distance between the outer ends of the wheel hubs and being free from obstructions preventing shifting of said axle axially in said inner raceway members and said spacing sleeves, whereby said axle is adapted to be shifted axially of said inner raceway members, spacing sleeves and wheel hubs while maintaining contact with the latter the full length thereof.

TRACY V. BUCKWALTER.